United States Patent [19]
Wu et al.

[11] Patent Number: 5,888,464
[45] Date of Patent: Mar. 30, 1999

[54] CATALYST COMPOSITION CONTAINING AN INTIMATELY COMBINED CERIUM-ZIRCONIUM OXIDE

[75] Inventors: Joseph Hui-Zhao Wu; Chung-Zong Wan, both of Somerset; John J. Steger, Pittstown, all of N.J.

[73] Assignee: Engelhard Corporation, Iselin, N.J.

[21] Appl. No.: 833,701

[22] Filed: Apr. 8, 1997

[51] Int. Cl.⁶ ....................................... B01J 23/10
[52] U.S. Cl. ...................... 423/213.5; 502/302; 502/304; 502/325; 502/349; 423/230; 423/239.1
[58] Field of Search .................... 502/304, 349, 502/302, 339, 325; 423/213.5, 220, 230, 239.1

[56] References Cited

U.S. PATENT DOCUMENTS

| | | | |
|---|---|---|---|
| 4,714,694 | 12/1987 | Wan et al. | 502/304 |
| 5,057,483 | 10/1991 | Wan | 502/304 |
| 5,075,276 | 12/1991 | Ozawa et al. | 502/304 |
| 5,212,142 | 5/1993 | Dettling | 502/304 |
| 5,248,650 | 9/1993 | Sekiba et al. | 502/303 |
| 5,478,543 | 12/1995 | Murota et al. | 502/304 |
| 5,532,198 | 7/1996 | Chopin et al. | 502/304 |

FOREIGN PATENT DOCUMENTS

| | | | |
|---|---|---|---|
| 0171151 | 2/1986 | European Pat. Off. | |
| 0313434 | 4/1989 | European Pat. Off. | |
| 0335847 | 10/1989 | European Pat. Off. | |
| 0393612 | 10/1990 | European Pat. Off. | |
| 0428752 | 5/1991 | European Pat. Off. | |
| 0441173 | 8/1991 | European Pat. Off. | |
| 0443765 | 8/1991 | European Pat. Off. | |
| 0 507 590 | 7/1992 | European Pat. Off. | B01D 53/36 |
| 0507590 | 10/1992 | European Pat. Off. | |
| 0 628 515 A1 | 12/1994 | European Pat. Off. | C01F 17/00 |
| 9500235 | 1/1995 | WIPO | |
| 9535152 | 12/1995 | WIPO | |
| WO 96/14153 | 5/1996 | WIPO | B01J 21/06 |

OTHER PUBLICATIONS

E. Luccini et al; Preparation of Zirconia–Ceria Powders by Coprecipitation . . . With Urea; 1989; Int. J. of Materials and Product Technology; vol. 4, No. 2, pp. 167–175 no month.

*Primary Examiner*—Michael Lewis
*Assistant Examiner*—Alexander G. Ghyka
*Attorney, Agent, or Firm*—Richard A. Negin

[57] ABSTRACT

A catalytic material effective for the reduction of $NO_x$ and the oxidation of at least carbon monoxide includes an oxygen storage component that provides superior oxygen storage function. The oxygen storage component includes an intimately combined mixed oxides including cerium, neodymium and zirconium. Typically, the ceria constitutes more than about 30 percent by weight of the ceria plus zirconia in the intimately combined mixed oxide, e.g., from about 32 to 44 weight percent. Preferably, the intimately combined mixed oxide also includes up to about 26 percent neodymia by weight of the ceria, e.g., from 18.6 to 23.5 percent. The intimately combined mixed oxide may be a co-formed material that may be prepared by, e.g., co-precipitating compounds of zirconium and the rare earth metal and calcining the co-precipitate.

21 Claims, No Drawings

CATALYST COMPOSITION CONTAINING AN INTIMATELY COMBINED CERIUM-ZIRCONIUM OXIDE

BACKGROUND OF THE INVENTION

1. Field of the Invention

The present invention is broadly concerned with catalysts for the abatement of pollutants, especially the abatement of $NO_x$ and CO. More specifically, the present invention is concerned with a novel catalytic material which comprises a catalytic component and an oxygen storage component comprising a mixed oxide of cerium and zirconium.

2. Related Art

It is well-known in the art to utilize oxidation catalysts, including those commonly referred to as three-way conversion catalysts ("TWC catalysts") to treat the exhaust gases of internal combustion engines. Oxidation catalysts promote the oxidation of unburned hydrocarbons ("HC") and carbon monoxide ("CO") in engine exhaust to $H_2O$ and $CO_2$. TWC catalysts promote such oxidation reactions and also promote the substantially simultaneous reduction to $N_2$ of nitrogen oxides ("$NO_x$") in the exhaust. It is well-known that successful functioning of the TWC catalyst to promote oxidation of HC and CO and to substantially simultaneously reduce $NO_x$ requires that the engine be operated at or close to stoichiometric air/fuel conditions.

It is also well-known in the art to provide such catalysts in the form of a catalytic material comprising a refractory inorganic oxide support material, e.g., activated alumina, on which is dispersed a catalytic metal component such as one or more platinum group metal components. The refractory inorganic oxide preferably has a high surface area to enhance the effectiveness of the catalytic metal component dispersed thereon. The catalytic material is normally provided as a thin coating or "washcoat" adhered to the walls of a refractory carrier substrate. The latter often takes the form of a body made from a suitable material such as cordierite, mullite or the like, which is formed to have a plurality of parallel, fine gas flow passages extending therethrough. Typically, there may be from about 150 to 450 or more such gas flow passages per square inch of end face area of the substrate.

Ceria is known to be a useful additive in oxidation catalysts and especially TWC catalysts, in which it is believed to serve as an oxygen reservoir and is sometimes referred to as an oxygen storage component. It is believed that, with the engine operating at air-to-fuel ratios which fluctuate above and below stoichiometric, the ceria takes up oxygen during lean (relatively oxygen-rich) periods of operation and makes oxygen available for the oxidation of hydrocarbons during rich (relatively oxygen-deficient) periods of operation.

At elevated temperatures both activated alumina and bulk ceria are subjected to phase change of their crystalline structures which lowers their surface area and significantly reduces the effectiveness of the catalyst. It is known to stabilize refractory inorganic oxides such as alumina and ceria against such thermal degradation. One known stabilization technique is to impregnate into bulk alumina a solution of a soluble rare earth metal salt, e.g., a cerium salt such as cerium nitrate, and then calcine the impregnated alumina to provide a ceria-impregnated alumina to stabilize the alumina against thermal degradation. It is similarly known to stabilize bulk ceria against thermal degradation by impregnating it with a solution of a soluble aluminum salt such as aluminum nitrate, followed by calcination to provide an alumina-impregnated bulk ceria. While such impregnation techniques are effective to reduce the effects of thermal degradation, ceria is, nonetheless, subjected to degradation and marked reduction of the efficiency of the catalyst of which it is a part, not only by thermal degradation, but also by poisoning of the catalyst by sulfur compounds, such as sulfur oxides which are engendered in the exhaust being treated from sulfur compounds contained in the fuel being burned.

Combined cerium-neodymium-zirconium oxides are commercially available as oxygen storage components for catalytic materials. Typical commercially available combined oxides contain not more than about 21 percent ceria by weight of ceria plus zirconia, in the combined oxide.

U.S. Pat. No. 4,714,694 to Wan et al, dated Dec. 22, 1987, discloses a catalyst material comprising aluminum-stabilized ceria as a support for platinum. The aluminum is impregnated into the bulk ceria to prevent deterioration of catalyst performance after exposure to high temperature aging.

U.S. Pat. No. 5,057,483 to Wan, dated Oct. 15, 1991, discloses a dual-layer catalyst comprising two coats of catalytic material. The first coat comprises platinum dispersed on alumina and bulk ceria. The second coat comprises rhodium dispersed on a co-formed rare earth metal-zirconium oxide and platinum dispersed on alumina. The co-formed rare earth metal-zirconium oxide may comprise one or more oxides of cerium, neodymium and/or yttrium (col. 4, lines 12–15) and contains from about 2 to 30 percent by weight rare earth metal oxides, the balance being predominantly or entirely zirconia (col. 8, lines 43–47). It was hitherto believed that if the quantity of ceria in the co-formed support exceeded about 10 mol percent, i.e., about 30 weight percent, the ceria would not remain in solid solution with the zirconia and the interaction between rhodium and ceria, which adversely affects catalytic performance, would increase to an unacceptable degree. Such interaction occurs mainly when the rhodium is dispersed directly on the ceria, but some such adverse reaction also occurs even when the rhodium is dispersed on other support particles, e.g., on alumina, that are intermixed with the ceria to prepare the catalytic material.

WIPO International Publication WO 95/35152, published Dec. 28, 1995, discloses a catalytic material comprising an oxygen storage composition that comprises ceria and zirconia in amounts of from 1 to 99 percent ceria, preferably 10 to 30 percent, based on the weight of ceria plus zirconia. There may also be an additional rare earth oxide in an amount of from 0.1 to 10 weight percent.

EPO Publication Number 0 507 590 A1, published Oct. 7, 1992, discloses a catalyst composition that may include ceria with zirconia in the form of a composite or solid solution with the weight ratio of the cerium oxide to the zirconium oxide being in the range of 100:2 to 100:60 (see page 3, lines 45–49), indicating a minimum of at least 62.5% ceria. The ceria is said to improve the durability of the catalyst (see page 4, lines 8– 9), and there is no recognition of any activity as an oxygen storage component.

U.S. Pat. No. 5,075,276, issued Dec. 24, 1991 to M. Ozawa et al, discloses a catalyst containing ceria as an oxygen storage component which is said to be useful for purification of exhaust gases. The Ozawa et al catalyst comprises a support substrate on which is disposed a washcoat comprising (a) a high surface area material which may be aluminum oxide or titanium oxide, (b) cerium oxide, (c) zirconium oxide and (d) at least one oxide of a rare earth element other than cerium and lanthanum, e.g., neodymium. At least part of the oxides of cerium, zirconium and the rare earth oxide(s) other than lanthanum and cerium is in the form described as a composite or solid solution, which is said to be obtained by either of two methods. One method comprises impregnating the catalyst layer (e.g., platinum on alumina) with three solutions of, respectively, a cerium salt, a zirconium salt and a salt of the rare earth metal, and then "burning" the impregnated catalyst layer at 600° C. or higher (col. 3, line 65 et seq.). The other method comprises mixing the three oxide powders with alumina and "burning" the mixture at 800° C. or higher (col. 4, line 5 et seq.). Catalytic materials such as platinum are then deposited on the oxide layer. Ozawa et al teaches a preference for the first method, citing remarkably superior catalytic performance (col. 4, lines 11–18).

SUMMARY OF THE INVENTION

The present invention relates to an oxygen storage component material comprising an intimately combined mixed oxide comprising oxides of cerium, neodymium and zirconium (ceria, neodymia and zirconia). The ceria comprises more than about 30 percent by weight of the combined weights of ceria plus zirconia in the intimately combined mixed oxide.

According to one aspect of the present invention, the weight of the ceria in the intimately combined mixed oxide may comprise from about 32 to 44 percent of the combined weights of ceria plus zirconia in the intimately combined mixed oxide. In a particular embodiment, the weight of the neodymia may comprise not more than about 26 percent of the weight of the ceria, e.g., the weight of the neodymia may be from about 18.6 to 23.5 percent of the weight of ceria in the intimately combined mixed oxide. In a particular embodiment, the ceria may comprise about 32.8 percent of the combined weight of ceria plus zirconia, and the neodymia may comprise about 21.4 percent of the weight of the ceria.

The intimately combined mixed oxide preferably comprises a co-formed material.

This invention also provides a catalytic material comprising an oxygen storage component material as described above in combination with a platinum group metal component. The platinum group metal component comprises at least one platinum group metal which may be dispersed on the oxygen storage component material or on a separate refractory support material. Optionally, the platinum group metal component may comprise one or more platinum group metals dispersed on both the oxygen storage component material and a separate support material.

The invention also relates to a method for treating a gas stream containing pollutants comprising at least carbon monoxide and $NO_x$ to convert the pollutants to innocuous substances. The method comprises flowing the gas stream in contact with a catalytic material as described above, under conversion conditions.

Reference herein to a catalytically active species by its elemental name without reference to a particular compound, alloy, etc., indicates the presence of that element in any suitable form, whether as an oxide or other compound, as the elemental metal, or as an alloy with one or more other metals.

The term "platinum group metal" means and includes the metals platinum, palladium, rhodium, ruthenium, osmium and iridium.

The term "bulk" used with reference to ceria, alumina or another component of the catalyst composition means that the ceria, alumina or other component is present as fine discrete particles. The term is intended to distinguish from the situation in which a component is "dispersed" on or "impregnated" into another material.

Reference to a catalytically active species such as a platinum group metal being "dispersed" on or "impregnated" into a bulk material, such as bulk ceria, means that a precursor of the catalytically active species, such as a soluble platinum salt, for example, potassium platinum chloride, has been dissolved or otherwise dispersed in a liquid vehicle into which the bulk material is placed to disperse the precursor onto the particles of the bulk material. This step is followed by calcination or other treatment of the bulk material to convert the dispersed precursor to the catalytically active form and affix it on the surface of, or within the surface layers of, the bulk material.

The term "co-formed" used with respect to a mixed oxide means that the two or more oxides are dispersed substantially throughout the entire matrix of the mixed oxides as will occur, for example, when the respective oxides or precursors thereof are co-precipitated or co-gelled. The defined term is intended to distinguish from a material being "impregnated" into or "dispersed" on another material.

The term "activated alumina" means a relatively high BET surface area alumina comprised predominantly of gamma-alumina, although other phases, especially eta- and delta-, may be present in minor proportions.

As used herein and in the claims, "conversion conditions" means conditions suitable for the catalyst composition of the invention to catalyze the reaction of one or more (preferably all three) of hydrocarbons, carbon monoxide and nitrogen oxides to "innocuous substances", i.e., to water, carbon dioxide and nitrogen.

DETAILED DESCRIPTION OF THE INVENTION AND SPECIFIC EMBODIMENTS THEREOF

An oxygen storage component ("OSC") in a catalyst composition helps to selectively convert CO to $CO_2$ and $NO_x$ to $N_2$. Ceria is currently the most widely used OSC in catalysts used to treat automobile engine exhausts, although other rare earth metal oxides can also serve as an OSC. The use of bulk ceria in intimate contact with a precious metal catalytic component is believed to facilitate the redox properties of the ceria at elevated temperatures (e.g., temperatures above 450° C.). However, ceria is not a thermally stable oxide. As noted in Wan et al U.S. Pat. No. 4,714,694 discussed above, bulk ceria rapidly loses its surface area upon exposure to high temperature. This is especially so in a net reducing atmosphere, i.e., a fuel-rich, oxygen-lean atmosphere. If the ceria is dispersed onto an alumina support (one of the two preparation techniques taught by Ozawa et al, U.S. Pat. No. 5,075,276, discussed above), the impregnated ceria tends to interact strongly with the alumina support in such a net reducing atmosphere to form a perovskite crystal structure, and to sinter drastically in a net oxidizing (fuel-poor, oxygen-rich) atmosphere. With loss of its surface area by any of the foregoing mechanisms (thermal degradation of bulk ceria, perovskite formation or sintering of dispersed ceria), the ceria becomes a dramatically less effective OSC after prolonged aging.

The present invention provides an intimately-combined mixed oxide of the rare earth metals cerium and neodymium with the oxide of zirconium, in which the cerium oxide constitutes more than about 30 percent by weight of the combined weights of the cerium oxide and the zirconium oxide. An intimate combination of the rare earth metal oxides and zirconia is not attained by impregnating the rare earth metals and zirconium into another material such as alumina, or by intermixing the rare earth metal oxides and zirconia with alumina or a third inorganic species and calcining the mixture, as described above in reference to the Ozawa et al Patent. Rather, an intimate combination of rare earth metal oxides and zirconia is attained by preparing a co-formed mixed oxide or by impregnating the rare earth metals into particles of a zirconium component, e.g., bulk zirconia, and calcining the impregnated particles. In either case, there is no substantial amount of another oxide, such as alumina, which will interfere with the oxygen storage capability of the intimately combined mixed oxide, and/or with the conversion performance of the platinum group metal dispersed thereon, and/or which will interact adversely with the platinum group metal.

A co-formed mixed oxide can be achieved by precipitation of any soluble rare earth metal and zirconium salts by any suitable technique such as co-precipitation, co-gelling or the like. One suitable technique, used to make a zirconia-ceria co-formed material but which can be adapted to make other co-formed rare earth metal-zirconium mixed oxides, is illustrated in the article by Luccini, E., Mariani, S., and Sbaizero, O. (1989) "Preparation of Zirconia Cerium Carbonate in Water With Urea" *Int. J. of Materials and Product Technology,* vol. 4, no. 2, pp. 167–175, the disclosure of which is hereby incorporated herein. As disclosed starting at page 169 of the article, a dilute (0.1M) distilled water solution of zirconyl chloride and cerium nitrate in selected proportions is prepared with ammonium nitrate as a buffer, to control pH. The solution was boiled with constant stirring for two hours and complete precipitation was attained with the pH not exceeding 6.5 at any stage. By altering the proportions of the zirconyl chloride and cerium nitrate, a suitable co-formed ceria-zirconia oxide may be attained in accordance with the present invention. Other zirconium and cerium (and optionally, other rare earth metal) salts that may be used in this procedure include chlorides, sulfates, nitrates, acetates, etc. The co-precipitates may, after washing, be dried to remove water and then calcined in air at about 500° C. or higher to provide the co-formed mixed oxides.

Any other suitable technique for preparing the intimately combined mixed oxide of the present invention may be employed, provided that the resultant product contains the rare earth metal oxides dispersed substantially throughout the entire zirconia matrix in the finished product, and not merely on the surface of the particles or only within a surface layer thereof, thereby leaving a substantial core of the zirconia matrix without the rare earth metal oxides dispersed therein.

The quantity of cerium preferably exceeds that of the neodymium in the intimately combined mixed oxide. For example, the weight of neodymia preferably does not exceed about 26 percent of the weight of the ceria. As shown in the example, there may be neodymia in a co-formed oxide in an amount of from about 18 to 26 percent of the weight of ceria.

The oxygen storage component material is preferably incorporated into a catalytic material that comprises a platinum group metal component comprising one or more platinum group metals. The platinum group metal component may be dispersed on the oxygen storage component (which then serves as a support material for the platinum group metal(s)) or on a separate refractory support material, or both, in a conventional manner. Typically, water-soluble compounds or water-dispersible complexes of one or more platinum group metals are dissolved or dispersed in water which is then impregnated into particles of the support material. Suitable compounds are chloroplatinic acid, potassium platinum chloride, ammonium platinum thiocyanate, amine solubilized platinum hydroxide, rhodium chloride, rhodium nitrate, palladium chloride, palladium nitrate, etc. If both platinum and palladium are to be impregnated onto the activated alumina particles, both are preferably in water soluble form such as, for example, the respective amine hydroxide or as chloroplatinic acid, palladium nitrate or palladium chloride. The impregnated support particles are then dried to remove the liquid and, preferably, are calcined to deposit the platinum group metal(s) onto the support material in a catalytically active form. In some cases, the completion of removal of the liquid may not take place until the catalyst is placed into use and subjected to the high temperatures encountered during operation. During the calcination step, or at least during the initial phase of use of the catalyst, the water-soluble platinum group metal compounds or water-dispersible complexes are converted into a catalytically active form of the platinum group metal or a compound thereof.

As indicated above, the support material may comprise a refractory inorganic oxide other than the intimately combined cerium-neodymium-zirconium oxide, e.g., activated alumina, zirconia, titania, ceria, etc. The particles bearing the platinum group metals and the particles of the intimately combined rare earth metal-zirconium oxide are typically rendered into a slurry which is applied to a suitable carrier substrate as described above. The coated substrate is then dried and, preferably, calcined, leaving the catalytic material adhered as a thin washcoat on the carrier substrate at a loading usually in the range of 0.5 to 6 grams per cubic inch. For automotive catalysts, the platinum group metals typically do not exceed about 10 percent of the catalytic material, by weight.

A Ce—Nd—Zr oxide OSC material in which the weight of the ceria is about 48.9 percent of the weight of the zirconia (i.e., in which the material comprises ceria in an amount of about 32.8 percent of the combined weight of ceria plus zirconia) may be prepared as follows. First, a zirconium hydroxide sol is prepared by precipitating zirconium sulfate with sodium hydroxide under reflux conditions to produce nanometer-sized crystals. The sulfur, sodium and other impurities are washed out, and an acid such as nitric acid is added to break up the aggregates and to obtain the zirconia sol. Cerium and neodymium salts are then added. Then, the pH is raised by adding ammonia, to induce precipitation. The precipitate may then be washed, filtered, dried and then calcined. The resulting material would comprise ceria in an amount of 32.8 percent of the combined weight of ceria plus zirconia, and neodymia in an amount of about 21.4 percent by weight of ceria.

The following Example illustrates the preparation and testing of specific embodiments of the invention.

EXAMPLE

Preparation of Co-Formed Ce—Nd—Zr Oxide E1

A solution designated solution "A" was prepared by dissolving 37.85 grams of cerium nitrate and 7.625 grams of neodymium nitrate in 100 grams of deionized water. A second solution, designated solution "B", was prepared by dissolving 100 grams of ammonium carbonate in 150 grams of deionized water. A third solution was prepared by dissolving 139.72 grams of zirconium nitrate with deionized water to produce 400 ml of solution. An 80 gram aliquot of solution B was added to the zirconium nitrate solution, which then gelled. The gel was thinned by adding a mixture of 10 ml of concentrated $HNO_3$ (70%) with 10 ml of deionized water. Solution A was then added, followed by the remainder of solution B, which caused the mixture to gel once again. The gelled suspension was homogenized with a Ross Homogenizer for two minutes. The pH of the homogenized gel was adjusted to pH 7 by adding a quantity of concentrated $HNO_3$. The gel was then centrifuged and washed twice with 800 ml of deionized water. The precipitates were collected, dried, ground and calcined at 550° C. for two hours to form a co-formed oxide. The BET surface area of the calcined material was measured at 102.5 $m^2/g$. This material was designated E1 and contained ceria in an amount corresponding to about 78.4 percent of the weight of zirconia (corresponding to about 44 percent of the combined weight of ceria and zirconia), and neodymia in an amount corresponding to about 18.6 percent of the weight of ceria, as measured by X-ray fluorescence spectrometry ("XRF").

Preparation of Co-Formed Ce—Nd—Zr Oxide E2

A second co-formed material was formed by preparing a solution of 22.82 grams cerium nitrate and 6.33 grams neodymium nitrate into 104 grams of a zirconium nitrate solution containing 20.04 weight percent zirconium calculated as zirconium oxide. A separate solution of 65 grams of ammonium carbonate was dissolved into 130 ml of deionized water. Then, 40 ml hydrogen peroxide (30%) was added to the carbonate solution to form a solution designated as the "base solution". The base solution was added to the cerium-neodymium-zirconium solution and precipitation occurred. The solution was then centrifuged and the precipitate was removed and washed twice with 1000 ml of deionized water. The precipitate was then collected, dried, ground and calcined at 500° C. for two hours. The BET surface area of the calcined precipitate was 31.4 $m^2/g$, and this co-formed material was designated material E2. Material E2 comprised ceria in an amount corresponding to about 58.3 percent of the weight of zirconia (corresponding to about 36.8 percent of the combined weights of ceria and zirconia), and neodymia in an amount corresponding to about 23.5 percent of the weight of ceria, as measured by X-ray fluorescence spectrometry ("XRF").

Preparation of Catalytic Particle Slurry

A quantity of gamma-alumina having a BET surface area of 150 $m^2/g$ was impregnated with a rhodium nitrate solution, dried and calcined, and contained 0.578 weight percent rhodium. Thirty grams of the rhodium-containing powder was impregnated with a solution of anionic platinum (in a platinum amine hydroxide form) and was then dried and calcined to obtain a 3.68 weight percent platinum loading. The platinum- and rhodium-bearing alumina was ballmilled with acetic acid to form a slurry designated as slurry A.

Preparation of Test Samples

Test samples were prepared by impregnating 0.75 grams of each of materials E1 and E2 with the anionic platinum solution, drying and calcining the materials to obtain a 0.3 weight percent platinum loading. The same was done for control materials R1 and R2, each of which comprised a commercially available co-formed cerium-zirconium-neodymium-oxide (Ce—Zr—Nd—O) material comprising about 20 weight percent ceria based on the combined weight of ceria plus zirconia. The surface areas of control materials R1 and R2 are in the range of about 40–50 $m^2/g$ after calcination. Each of the platinum-containing Ce—Nd—Zr—O materials was then mixed with a separate quantity of slurry A and an alumina acetate binder. In each case, the combined slurry was dried and calcined at 450° C. to form a solid, and each solid contained 34.1 percent by weight platinum- and rhodium-bearing alumina, 24.4 percent by weight co-formed Ce—Zr—Nd—O and 41.5 percent by weight alumina binder.

A reference control material designated R3 was prepared without a co-formed Ce—Zr—Nd—O material, and comprised 34.1 percent by weight of the platinum- and rhodium-bearing alumina and 65.9 percent by weight alumina binder.

Each solid catalytic material was crushed and ground to obtain particles of average diameter of about 300 micrometers.

Test Procedure

Twenty milligrams of each test material was mixed with 80 milligrams of cordierite particles of the same average size, and to provide a test sample which was loaded into a model gas reactor. The test sample was aged at 1000° C. for six hours in a simulated exhaust gas mixture employing an air/fuel ratio perturbation of ±0.2 A/F at 0.167 Hertz at stoichiometric set point and 350,000 VHSV space velocity. The conversion activity of each aged test sample was then evaluated at 500° C. in the model gas reactor with a similar exhaust gas mixture, employing a perturbation of ±0.1 A/F and two different $SO_2$ levels. The average gas feed composition during the test was 0.57 percent CO, 0.19 percent $H_2$, 0.19 percent NO, 0.285 percent $O_2$, 20 ppm $SO_2$ in one test and 2 ppm $SO_2$ in another test, with balance nitrogen in each case. The results are set forth in TABLES IA and IB, in which the samples are identified by the type of co-formed material (if any) therein. For comparison purposes, the amount of ceria in the intimately combined mixed oxide of each sample is given as a weight percent of the combined weight of ceria plus zirconia. Similarly, the quantity of neodymia is given as a percentage of the weight of ceria. It is thus seen that samples E1 and E2 contain greater proportions of ceria to zirconia than in intimately combined ceria-zirconia oxygen storage components of the prior art.

TABLE IA

| Sample | XRF Wt. % $CeO_2/$ $CeO_2 + ZrO_2$ | XRF Wt. % $Nd_2O_3/CeO_2$ | Percent Conversion NO 20 ppm $SO_2$ | 2 ppm $SO_2$ |
|---|---|---|---|---|
| R1 | 19.2% | 20.1% | 75% | 84% |
| R2 | 21.3 | 26.04 | 78 | 86 |
| R3 | — | — | 64 | 69 |
| E1 | 44 | 18.6 | 84 | 93 |
| E2 | 36.8 | 23.5 | 85 | 96 |

TABLE IB

| Sample | XRF Wt. % $CeO_2/$ $CeO_2 + ZrO_2$ | XRF Wt. % $Nd_2O_3/CeO_2$ | Percent Conversion CO 20 ppm $SO_2$ | 2 ppm $SO_2$ |
|---|---|---|---|---|
| R1 | 19.2% | 20.1% | 67% | 90% |
| R2 | 21.3 | 26.04 | 72 | 88 |
| R3 | — | — | 42 | 45 |
| E1 | 44 | 18.6 | 77 | 93 |
| E2 | 36.8 | 23.5 | 79 | 95 |

The data of TABLES IA and IB clearly show that, for quantities of ceria in an intimately combined material above thirty percent, the resulting catalytic material provides superior resistance to aging relative to conventional co-formed oxygen storage component materials, so that the catalytic materials of the present invention exhibit better $No_x$ and CO conversion activity after aging than do comparative materials having lesser proportions of ceria. This result was obtained despite teaching in the prior art that ceria should not exceed about 30 percent by weight of ceria plus zirconia (see, e.g., U.S. Pat. No. 5,057,483, discussed above).

While the invention has been described in detail with reference to a particular embodiment thereof, it will be apparent that upon a reading and understanding of the foregoing, numerous alterations to the described embodiment will occur to those skilled in the art and it is intended to include such alterations within the scope of the appended claims.

What is claimed is:

1. An oxygen storage component material comprising an intimately combined mixed oxide comprising oxides of cerium, neodymium and zirconium in which the ceria comprises from about 36.8 to 44 percent by weight of the combined weights of ceria plus zirconia in the intimately combined mixed oxide.

2. The material of claim 1 comprising neodymia in an amount of not more than about 26 percent of the weight of the ceria.

3. The material of claim 2 comprising neodymia in an amount of from about 18.6 to about 23.5 percent of the weight of the ceria.

4. The material of claim 1 wherein the intimately combined mixed oxide comprises a co-formed material.

5. A catalytic material effective for the conversion of at least one of hydrocarbons, carbon monoxide and $NO_x$ in a gas stream, comprising:

a platinum group metal component in combination with the oxygen storage component material of claim 1.

6. The catalytic material of claim 5 wherein the platinum group metal component comprises at least one platinum group metal dispersed on the oxygen storage component material.

7. The catalytic material of claim 5 wherein the platinum group metal component comprises a refractory support material other than the oxygen storage component material, having at least one platinum group metal dispersed thereon.

8. The catalytic material of claim 5 comprising neodymia in an amount of not more than about 26 percent of the weight of the ceria.

9. The catalytic material of claim 5 comprising neodymia in an amount of from about 18.6 to about 23.5 percent of the weight of the ceria.

10. The catalytic material of claim 5 wherein the intimately combined mixed oxide comprises a co-formed material.

11. A method for treating a gas stream containing pollutants comprising at least carbon monoxide and $NO_x$ to convert the pollutants to innocuous substances, the method comprising flowing the gas stream in contact with a catalytic material under conversion conditions, wherein the catalytic material comprises a platinum group metal component in combination with an intimately combined mixed oxide comprising oxides of cerium, neodymium and zirconium in which ceria comprises from about 36.8 to 44 percent by weight of the combined weights of ceria plus zirconia in the intimately combined mixed oxide.

12. The method of claim 11 wherein the intimately combined mixed oxide comprises neodymia in an amount of not more than about 26 percent of the weight of ceria therein.

13. The method of claim 11 wherein the intimately combined mixed oxide comprises a co-formed material.

14. The material of claim 1 comprising neodymia in an amount of about 21.4 percent of the weight of the ceria.

15. The material of claim 14 wherein the intimately combined mixed oxide comprises a co-formed material.

16. A catalytic material effective for the conversion of at least one of hydrocarbons, carbon monoxide and $NO_x$ in a gas stream, comprising:

a platinum group metal component in combination with the oxygen storage component material of claim 14.

17. The catalytic material of claim 16 wherein the platinum group metal component comprises at least one platinum group metal dispersed on the oxygen storage component material.

18. The catalytic material of claim 16 wherein the platinum group metal component comprises a refractory support material other than the oxygen storage component material, having at least one platinum group metal dispersed thereon.

19. The catalytic material of claim 16 wherein the intimately combined mixed oxide comprises a co-formed material.

20. The method of claim 11 wherein the intimately combined mixed oxide comprises neodymia in an amount of about 21.4 percent of the weight of ceria therein.

21. The method of claim 20 wherein the intimately combined mixed oxide comprises a co-formed material.

* * * * *